United States Patent [19]

Perez-Cavero et al.

[11] 4,254,403
[45] Mar. 3, 1981

[54] SYSTEMS FOR TRANSMITTING INFORMATION IN AN ALTERNATING CURRENT ELECTRICITY SUPPLY SYSTEM

[75] Inventors: Leonardo Perez-Cavero, Media, Pa.; Michael W. A. Cross, Bristol, England; Geoffrey Fielding; Frederick M. Gray, both of Stafford, England

[73] Assignee: The General Electric Company Limited, London, England

[21] Appl. No.: 63,965

[22] Filed: Aug. 6, 1979

Related U.S. Application Data

[63] Continuation of Ser. No. 786,578, Apr. 11, 1977, abandoned, which is a continuation-in-part of Ser. No. 596,443, Jul. 18, 1975, abandoned.

[30] Foreign Application Priority Data

Jul. 18, 1974 [GB] United Kingdom ............... 31964/74

[51] Int. Cl.³ .............................................. H04B 3/54
[52] U.S. Cl. ................................ 340/310 R; 328/127; 328/151
[58] Field of Search ................... 455/352; 340/310 R, 340/310 A, 310 CP, 538; 307/3; 328/115, 151, 128, 127; 375/68

[56] References Cited

U.S. PATENT DOCUMENTS

| | | | |
|---|---|---|---|
| 3,488,517 | 1/1970 | Cowan et al. | 340/310 A |
| 3,594,584 | 7/1971 | Woods | 340/310 A |
| 3,714,451 | 1/1973 | Whitney et al. | 340/310 R |
| 3,818,466 | 6/1974 | Honda | 340/310 R |

Primary Examiner—James J. Groody
Attorney, Agent, or Firm—Kirschstein, Kirschstein, Ottinger & Cobrin

[57] ABSTRACT

A system for transmitting information in an alternating current supply system wherein information is transmitted by reducing the instantaneous value of the supply voltage during a corresponding period in each of a selection of cycles of the supply voltage, the selection of cycles determining the information transmitted. To minimize disturbance of the system voltage the period of alteration includes a voltage zero. The alteration is effected by closing a switch connected across the system for the period the voltage reduction is required.

10 Claims, 8 Drawing Figures

DISTRIBUTION TRANSFORMER

TRANSMITTER

SYSTEMS FOR TRANSMITTING INFORMATION IN AN ALTERNATING CURRENT ELECTRICITY SUPPLY SYSTEM

This is a continuation of application Ser. No. 786,578, filed Apr. 11, 1977 which in turn is a continuation-in-part of application Ser. No. 596,443, filed July 18, 1975, both now abandoned.

BACKGROUND OF THE INVENTION

1. Field of the Invention

This invention relates to systems for transmitting information in an alternating current electricity supply system.

2. Description of the Prior Art

In known such systems information is transmitted by distorting the supply voltage waveform. In one known system the distortion takes the form of a reduction of the peak value of the supply voltage in each of a selection of cycles of the supply voltage waveform, the selection of cycles determining the information transmitted. Unfortunately, such reduction of the peak voltage can cause appreciable disturbance to certain loads, e.g. lighting loads. Furthermore, it is sometimes difficult to distinguish between peak voltage reduction due to load switching and peak voltage reduction effected for transmitting information.

The inventors have appreciated that this difficulty could be alleviated by arranging for the distortion to take the form of a reduction of the instantaneous value of the supply voltage during the same small fractional part of each of a selection of cycles of the supply voltage waveform, said part including a time of voltage zero. However, the problem of how to effect such alteration only in selected cycles is a considerable one. This problem is high-lighted by the disclosure of U.S. Pat. No. 3,488,517 filed by James Macmillan Cowan, Frederick Edwin Brooker, Brian Nield, William James Stuart Rogers, Edmund Smith, Frank Tarpey and John Durnford on June 26, 1967. In that specification a system is described wherein voltage reductions in respective periods each including a time of voltage zero are produced to transmit information. However, the method employed to effect such reductions is to load a supply transformer in the supply system in such a manner that a direct current component is drawn from the transformer and a uni-directional flux component gradually builds up in at least one limb of the core of the transformer. As a result, after a significant period, typically fifteen seconds, the transformer core magnetically saturates for a short period during each subsequent cycle with a resultant reduction in the transformer secondary voltage in each cycle for a short period around a voltage zero. It will be appreciated that with this system, since several seconds elapses between the operation of a control circuit to introduce a direct current component and eventual magnetic saturation, it is virtually impossible to effect voltage reductions in single designated cycles. Hence determination of the information to be transmitted by selection of the cycles in which voltage reduction is effected, e.g. using a 5 from 32 code, is virtually impossible.

SUMMARY OF THE INVENTION

It is an object of the present invention to provide a transmitter for use in a system for transmitting information in an alternating current electricity supply system which can be used to effect voltage reductions around a voltage zero in single designated cycles.

Accordingly the invention provides in a system for transmitting information in an A.C. electricity supply system by reducing the instantaneous value of the A.C. supply voltage during the same small fractional part of each of a selection of cycles of the supply voltage waveform, said part including a time of voltage zero, a transmitter comprising: controllable switch means connected across said supply system to draw from said system when said switch means is closed a current of a sufficient magnitude to reduce the instantaneous value of the A.C. supply voltage during the time that said switch means is closed; and switch control means for closing said switch means for a said small fractional part of selected single cycles of the supply voltage waveform.

In a transmitter according to the invention the switch means suitably comprises an electronic switch of the kind which, once closed, remains closed until the current through the switch means returns to zero, e.g. a thyristor. When using such a switch connected across a point in the system which presents an essentially inductive impedance when the switch is closed shortly before a voltage zero the current drawn from the system, and hence the voltage reduction effected, is substantially the same in amplitude, shape and duration, on both sides of the voltage zero following switch closure. In many supply systems the secondary winding of a distribution transformer in the system proves to be such a suitable point.

The switch control means in a transmitter according to the invention suitably comprises peak detection means which produces an output indicative of the occurrence a peak value of the voltage of the supply system; timing means which initiates a timing period in response to the output of said peak detection means; and a pulse generator which generates an operating pulse for the switch in response to the end of the timing period defined by said timing means.

The invention further provides in a system for transmitting information in an A.C. electricity supply system by reducing the instantaneous value of the A.C. supply voltage during the same small fractional part of each of a selection of cycles of the supply voltage waveform, said part including a time of voltage zero, a receiver comprising: an integrator which integrates the instantaneous value of a voltage of the supply system for short periods each starting at zero crossings of the waveform of said voltage; and means for detecting when the output of said integrator for an integration period differs from the output of the integrator for the preceding integration period.

Said detecting means suitably comprises a capacitance arranged to charge to the peak value of the output of said integrator; means for partly discharging said capacitance between integration periods; and means for monitoring the supply of charging current to said capacitance.

BRIEF DESCRIPTION OF THE DRAWINGS

One system, in accordance with the invention, for transmitting information in an alternating current electricity supply system will now be described, by way of example, with reference to the accompanying drawings in which.

DESCRIPTION OF THE PREFERRED EMBODIMENT

In the system to be described the required voltage alteration for information transmission is effected by closing a switch on the secondary side of a distribution transformer in the electricity supply system. The switch thus serves as a transmitter for the information transmission system.

Figure 1:
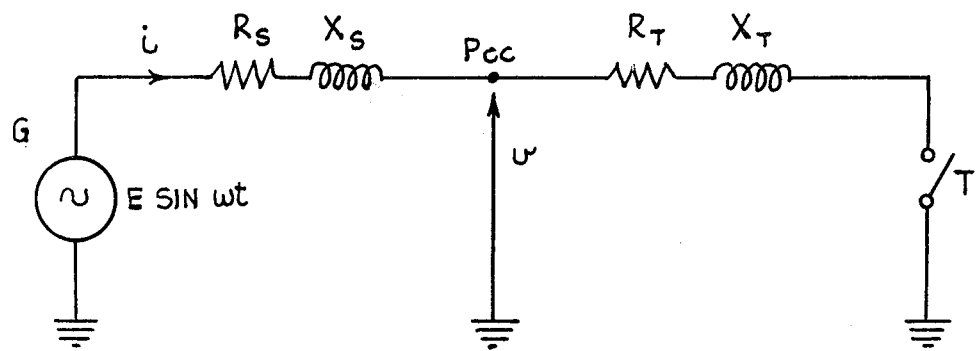
FIG. 1 is an equivalent circuit diagram of the system.

FIG. 1 shows an equivalent circuit of the arrangement where

T represents the switch;

G represents the high voltage source of the supply system which produces a voltage of value $E \sin \omega t$;

$R_S$ represents the resistance of the supply system between the distribution transformer and the generator G;

$X_S$ represents the corresponding inductance;

$R_T$ represents the resistance of the distribution transformer; and $X_T$ represents the corresponding inductance.

When the switch T is closed at an angle $\theta$ on the source voltage waveform, a current i is caused to flow whose instantaneous value is given by the expression:

$$i = \frac{E}{Z}[\sin(\omega t + \theta - \phi) - e^{-Rt/L}\sin(\theta - \phi)] \quad (1)$$

where $Z = (R_S + R_T) + j(X_S + X_T)$, that is the total impedance of the system between the generator G and the switch T;

$R = R_S + R_T$, that is the resistive component of Z $X = X_S + X_T$, that is the inductive component of Z $\phi = \tan^{-1} X/R$;

$L = X/\omega$; and $t = 0$ at the instant the switch T is closed.

The current i gives rise to a voltage v at the primary terminals of the distribution transformer. It will be appreciated that this voltage v appears at the primary terminals of the other distribution transformers in the supply system, the point at which v appears consequently being designated the point of common coupling (PCC) in FIG. 1. The instantaneous value of the voltage v is given by the expression $$v = \frac{EZ_T}{Z}\left[\sin(\omega t + \theta - \phi + \phi_T) - \frac{\sin(\phi - \phi_T)\sin(\theta - \phi)e^{-Rt/L}}{\sin \phi}\right] \quad (2)$$

where $\phi_T = \tan^{-1} X_T/R_T$

It should be noted that equations (1) and (2) have been derived for an idealized system in which the effects of capacitance have been neglected. In the system to be described the switch comprises a thristor so that when the switch is closed, i.e. the thyristor is fired, a current pulse is produced whose waveform is given by the equation (1) above, the current pulse terminating when the value of current i first returns to zero after the thyristor has been fired.

In general, the earlier the thyristor is fired in the positive or negative half cycle of the source voltage waveform, the larger is the current pulse. However, large current pulses give rise to 'flicker' disturbance in the supply system. Consequently, in accordance with the invention, the thyristor is fired as late as possible consistent with producing an adequate current pulse to achieve reliable signalling so that the voltage reductions for signalling purposes occur in the region of voltage zeros. The amplitude and duration of the current pulse must also be kept small enough to avoid magnetic saturation of the core of the distribution transformer. Furthermore, by minimising the amplitude and duration of the current pulse, economies can be made in both the power and energy ratings of the transmitter.

Considering the particular case of a 500 KVA distribution transformer supplied via a 30 MVA 132 kV/11 kV transformer in a 50 cycle per second system, then the following values for the above mentioned parameters would apply to a base voltage of 340 sin $\omega t$,

| | | |
|---|---|---|
| $R_S + jX_S$ | = $(0.23 + j1.506) \times 10^{-3}$ ohm | |
| $R_T + jX_T$ | = $(4.80 + j16.3) \times 10^{-3}$ ohm | = $17.0 \times 10^{-3}$ ohm |
| $R + jX$ | = $(5.03 + j17.8) \times 10^{-3}$ ohm | = $18.5 \times 10^{-3}$ ohm |
| $\phi$ | = $\tan^{-1} 17.8/5.03 = \tan^{-1} 3.54 = 74° 13'$ | |
| $\phi_T$ | = $\tan^{-1} 16.3/4.8 = \tan^{-1} 3.4 = 73° 37'$ | |
| L | = $17.8/\omega = 0.057$ mH | |
| R/L | = $5.03/0.057 = 88$ | |

A convenient value for the firing angle $\theta$ is $90 + \phi$. Thus, in this particular case, the firing angle $\theta$ will be 164.2° for a positive current pulse and 344.2° for a negative current pulse.

Figure 2:
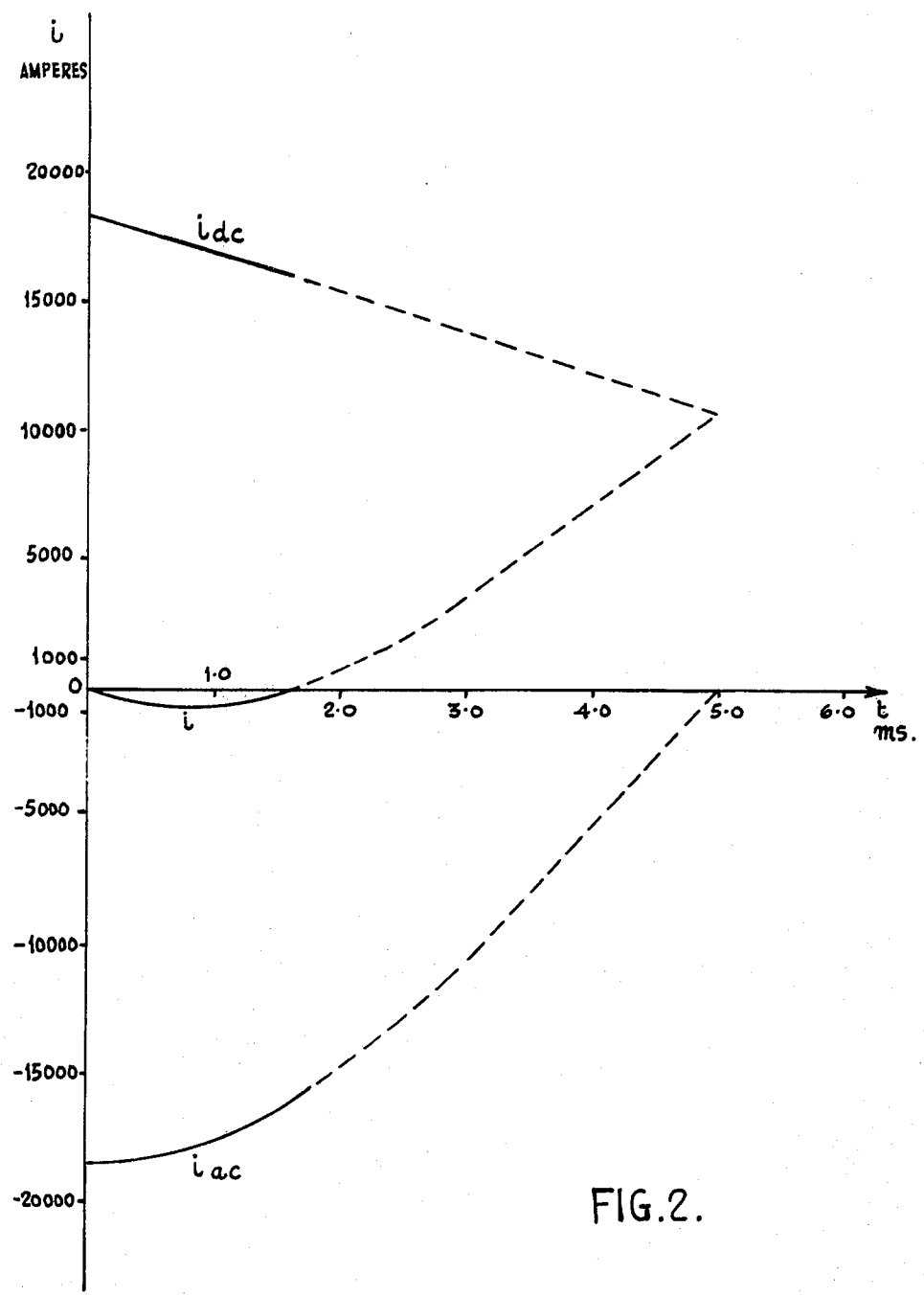
FIGS. 2 and 3 show the waveforms of certain voltages and current appearing in the system of FIG. 1.

In FIG. 2 the waveform of the current i for a firing angle $\theta$ of 344.2° is shown, the full line indicating the current pulse obtained when the switch T is a thyristor so that the current i ceases at the first current zero after firing of the thyristor. In FIG. 2 the waveforms of the a.c. and d.c. components $i_{ac}$ and $i_{dc}$ of the current i are also shown to illustrate the significance of the d.c. component.

It will be seen from FIG. 2 that a current pulse of peak value approximately 700 amperes and duration 1.8 milliseconds is obtained, the pulse starting at time $t = 0$ when $\theta = 344.2°$.

Figure 3:
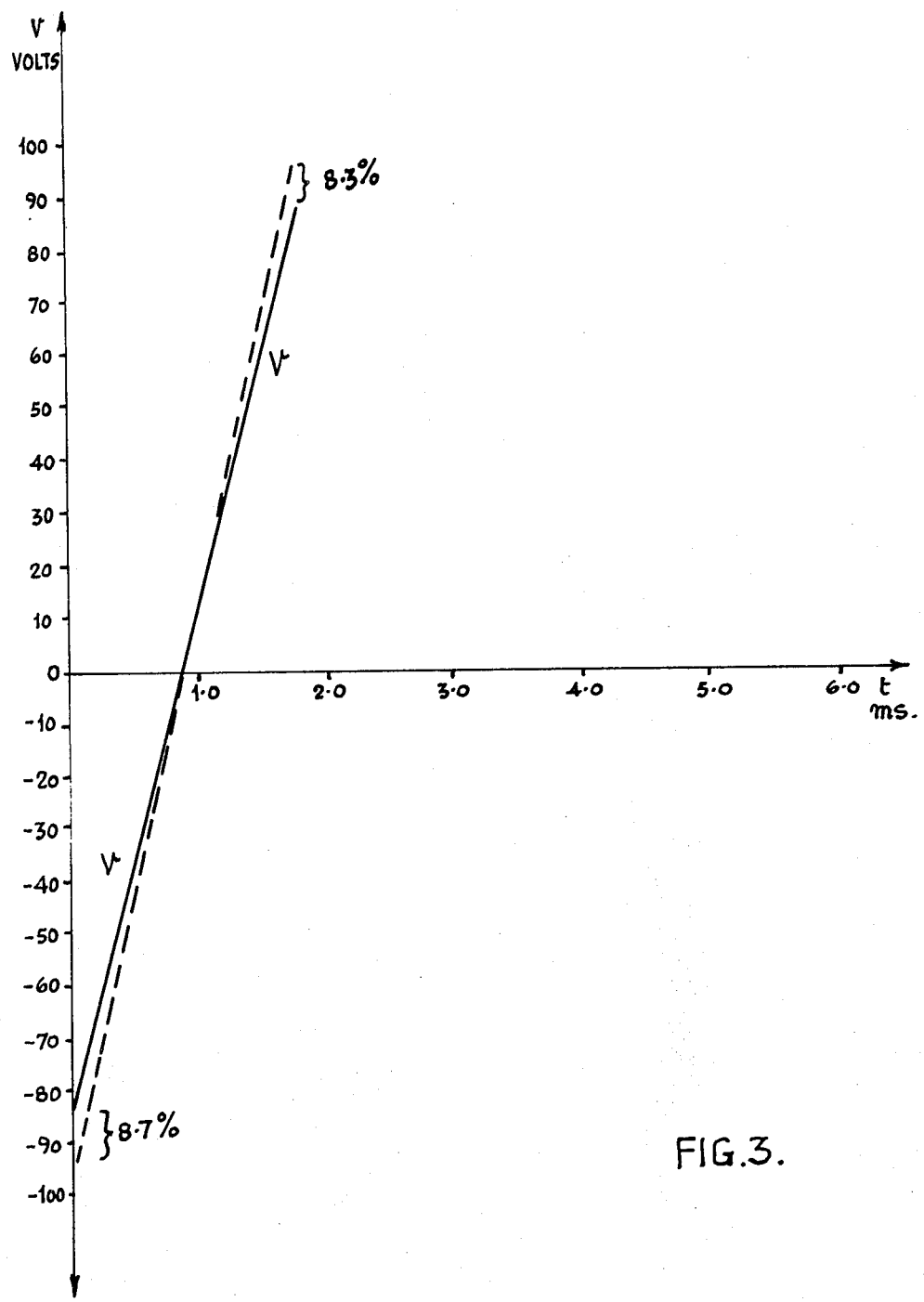

The full line in FIG. 3 shows the waveform of the voltage v during the current pulse produced with a firing angle $\theta$ of 344.2°, the broken line showing the waveform of voltage v without switching. It will be seen that a voltage reduction of approximately 8% is obtained.

Exactly similar current and voltage waveforms are obtained for a firing angle of 164.2° except that the polarities of the voltages and currents are reversed.

In practice the voltage reduction obtained is slightly lower than that shown in FIG. 3 due to the impedance in the switch T and its connections. However, tests have shown that the voltage reduction obtained in practice is equal to any reduction caused by system loads, over the time period of 1.8 milliseconds shown in FIGS. 2 and 3, and the fact that the reduction due to switching is introduced for only 0.9 millisecond (approximately 16 degrees) on each side of the voltage zero means that the disturbance to loads is very small.

From the point of view of convenience in receiver design it is advantageous to arrange for the firing to be at an angle late in the negative half-cycle (i.e. $\theta = 344.2°$ in the example considered above) such that the current pulse is negative as shown on FIG. 2 and the voltage after the zero-crossing is positive-going as shown in FIG. 3.

Figure 5:
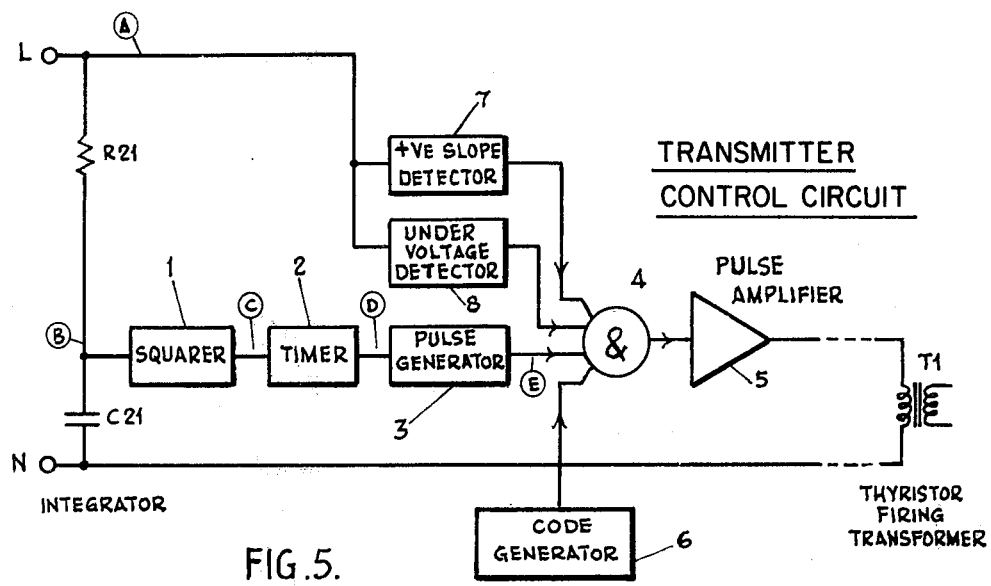
Figure 6:
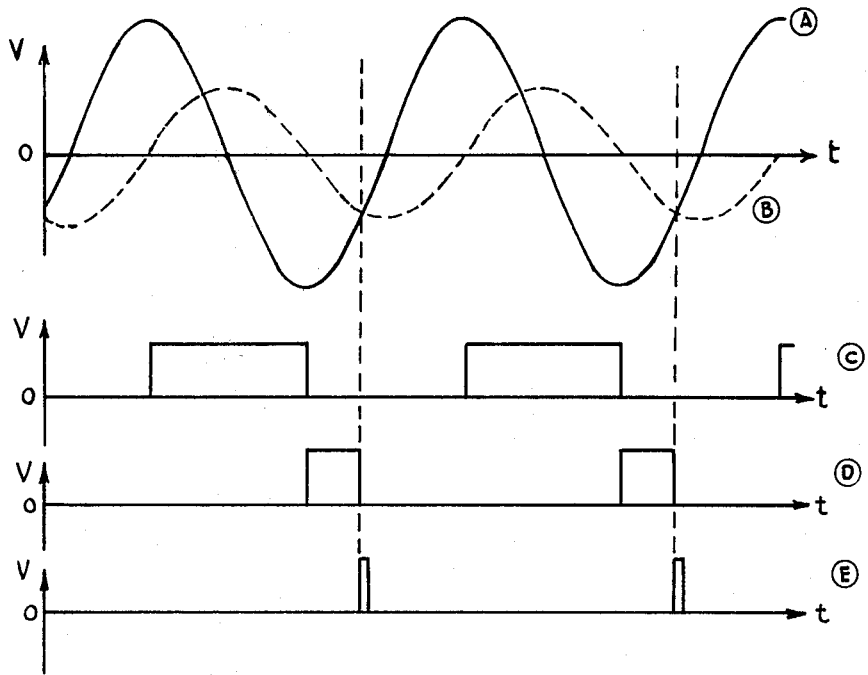
FIG. 6 shows the waveforms of various voltages appearing in the circuit of FIG. 5.

One particular form of transmitter will now be described by way of example with reference to FIGS. 4, 5 and 6.

As indicated above, the transmitter essentially comprises a thyristor, and in a polyphase system there will, normally, be a separate thyristor for each phase of the system.

Figure 4:
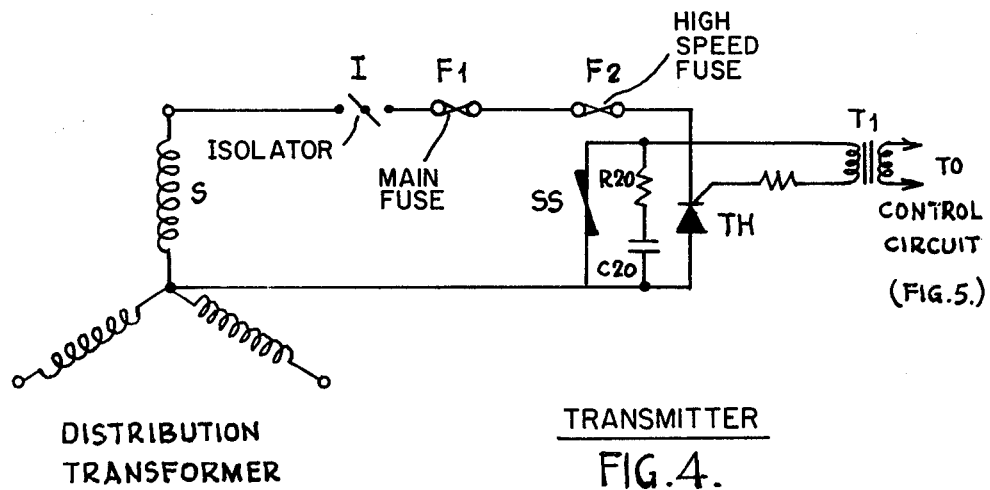
FIGS. 4 and 5 are circuit diagrams of a transmitter for use in the system.

Referring to FIG. 4, each thyristor TH is connected across the corresponding phase winding S of the secondary of the distribution transformer, the thyristor TH and the associated components for one phase only being shown in FIG. 4 for the sake of simplicity. The thyristors are as near as possible to the distribution transformer to minimize the impedance of the connecting cables.

Connection of the thyristor TH to the transformer is via an isolator I and a main fuse F1. A high speed fuse F2 protects the thyristor against excessive $I^2t$ dissipation in the event of incorrect firing angle. F2 is graded to clear before F1.

Protection against voltage surges which might damage the thyristor or cause false operation is provided by a filter network comprising a series-connected capacitor C20 and resistor R20, and a surge suppressor SS connected across the thyristor.

The thyristor is fired at the correct moment by a control circuit via a pulse transformer T1 which provides isolation between the supply voltage and the control circuit.

The function of the control circuit is to provide firing pulses at the correct point on selected cycles of the supply voltage waveform.

The control circuit will now be described with reference to FIG. 5 which is a block schematic diagram of the circuit, and FIG. 6 which shows the waveforms appearing at various points in the circuit.

In the control circuit the appropriate phase voltage of the supply (see curve A of FIG. 6) is fed to an integrator comprising resistor R21 and capacitor C21 to provide an output (see curve B of FIG. 6) which lags the supply phase voltage by 90° irrespective of supply frequency. The output from the integrator is fed to a squarer 1 and the negative going edge of the output of the squarer (see curve C of FIG. 6) starts a timer 2, the timer thus being started at the negative peak of the supply voltage. The timer produces a pulse (see curve D of FIG. 6) of duration equal to the period after the negative peak of the supply voltage at which the firing pulse is required to occur. The negative going edge of the timer pulse actuates a pulse generator 3 to provide a pulse (see curve E of FIG. 6) of about 100 μsecs duration, this pulse being fed to a first input of an AND gate 4 whose output is fed via an amplifier 5 to the pulse transformer T1.

The selection of cycles of the supply during which firing pulses are applied to the thyristor is effected by a code generator 6 which applies an output signal to a second input of the gate 4 so as to allow the gate to open only during the selected cycles.

A typical coding method employs a 5 from 32 code with alternate cycle blanking. In this method after the transmission of a start pulse by effecting a voltage reduction in cycle one, address information is transmitted by effecting voltage reductions in three selected ones or odd numbered cycles 3 to 23, and instruction information is transmitted by effecting a voltage reduction in a selected one of odd numbered cycles 25 to 31. The code generator will thus be arranged to produce a corresponding pattern of pulses when employing such a coding method.

To reduce the likelihood of the application of firing pulses to the thyristor at an incorrect firing angle a detector 7 applies a signal to a third input of the gate 4 to allow the gate to open only when the supply voltage waveform has a positive slope, and a detector 8 applies a signal to a fourth input of the gate 4 to allow the gate 4 to open only when the instantaneous value of the supply voltage is less than a predetermined value.

The voltage reductions produced by the transmitter will appear at all points in the system beyond the point of common coupling. One particular receiver for detection of the voltage reductions will now be described by way of example with reference to FIGS. 7 and 8.

The receiver is designed to measure the integral of the voltage waveform during a fixed period of time. After every measurement the integrator is reset to zero. Each integration is compared with the previous one in order to look for a significant amplitude reduction indicative of a transmitted signal.

As explained above, the transmitter is fired late in the negative half cycle of the supply waveform so as to reduce the voltage in the region of the negative to positive zero crossing. Hence the receiver is designed to detect a negative to positive zero crossing and integrate the voltage for a fixed period after this during which the voltage is still reduced, i.e. less than 0.9 millisecond.

Figure 7:
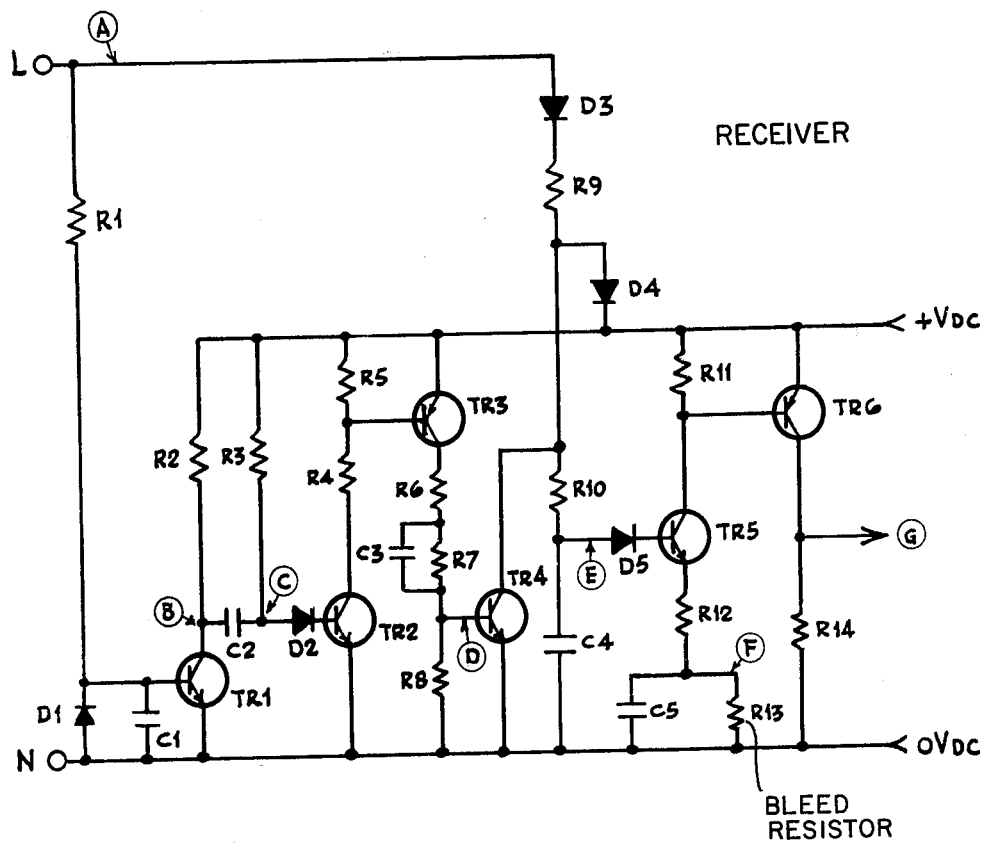
FIG. 7 is a circuit diagram of a receiver for use in the system.

Referring to FIG. 7, the required integration is achieved by feeding a capacitor C4 via resistors R9 and R10 and a rectifier D3 from the supply voltage (see curve A of FIG. 8) at the point in the system where the receiver is located.

A transistor TR4 connected across the capacitor C4 and resistor 10 is arranged to become non-conducting at the moment of negative to positive zero crossing and conducting again after the integration period. The resistor R10 is small in value and serves only to limit the discharge current of capacitor C4 when the transistor TR4 conducts. The effectiveness of integration thus depends essentially on the values of capacitor C4 and resistor R9, the reactance of capacitor C4 being made small compared to the value of resistor R9 to achieve effective integration.

A catching diode D4 prevents the capacitor C4 charging above the potential of the positive terminal of a d.c. supply for the receiver during exceptional supply voltage disturbances.

The peak voltage to which the capacitor C4 charges (see curve E of FIG. 8) during the period the transistor TR4 is non-conducting is a measure of the integral of the supply voltage during this period. Operation of the transmitter will result in a lower value of this integral and thus operations of the transmitter can be detected by detection of low values of the peak charging voltage of capacitor C4.

To detect these low values of peak voltage a memory capacitor C5 is charged from the capacitor C4. The capacitor C5 is connected in series with a resistor R12 between the negative terminal of the receiver d.c. supply and the emitter of a transistor TR5 whose base is connected via a rectifier D5 to the junction between the capacitor C4 and the resistor R10, the collector of transistor TR5 being connected via a resistor R11 to the positive terminal of the receiver d.c. supply. The capacitor C5 thus charges to the peak value of the integration voltage on capacitor C4 less the voltage drops across rectifier D5 and the emitter-base junction of transistor TR5. Only a small current is extracted from the capacitor C4, the majority being provided through transistor TR5 via its collector circuit resistor R11. The resistor R12 limits the charging current of capacitor C5 to a practical value and the diode D5 protects the transistor TR5 from excessive reverse base-emitter voltage.

A bleed resistor R13 connected across the capacitor C5 discharges it at a relatively slow rate compared with its charging rate. If a peak charging voltage across the capacitor C4 is greater than the voltage to which the capacitor C5 has discharged, the capacitor C5 will receive a pulse of charging current. If the peak charging voltage across the capacitor C4 is equal to or less than the voltage across capacitor C5 the capacitor C5 will not receive a pulse of charging current (see curve F of FIG. 8).

The occurrence of a low peak charging voltage across the capacitor C4, such as results from operation of the transmitter, will thus be indicated by the absence of a charging current pulse for capacitor C5.

The slower the discharge rate of the capacitor C5, the smaller will be the reduction of the peak charging voltage of the capacitor C4 required to cause the loss of a charging current pulse. Thus the sensitivity of the receiver depends on the value of the resistor R13.

The charging current pulses of capacitor C5 are monitored by a transistor TR6 whose base is connected to the collector of transistor TR5, the receiver output (see curve G of FIG. 8) being derived across a resistor R14 connected between the collector of transistor TR6 and the negative terminal of the receiver d.c. supply, the emitter of transistor TR6 being connected to the positive terminal of the receiver d.c. supply. The pattern of missing pulses in the receiver output thus corresponds to the pattern of pulses produced by the coding generator 6 in the transmitter.

Alternatively, the charging current pulses may be monitored by a differentiator connected across the capacitor C5.

To obtain the required control of the conduction of the transistor TR4, the system supply voltage is applied via a resistor R1 across the base-emitter junction of a transistor TR1, a rectifier D1 being provided to limit the reverse base-emitter voltage of transistor TR1, and the transistor being provided with a collector circuit resistor R2.

During negative excursions of the system supply voltage the transistor TR1 is held off by the current in resistor R1 and rectifier D1 so that the transistor collector is at the potential of the positive terminal of the receiver supply. At the moment of negative-to-positive zero crossing of the system supply voltage, the transistor TR1 starts to conduct causing the collector potential of transistor TR1 (see curve B of FIG. 8) to fall rapidly from the positive receiver supply potential substantially to zero potential. The transistor TR1 remains conducting until the following positive-to-negative zero crossing of the supply voltage whereupon its collector potential returns rapidly to the positive receiver supply potential. The transistor TR1 and its associated components thus comprise reference means providing at the collector of transistor TR1 an output whose negative-going edges indicate the occurrence of negative-to-positive zero crossings in the supply voltage.

The collector potential of the transistor TR1 is coupled through a capacitor C2 to a point C connected to the base of a transistor TR2 via a rectifier D2 and to the positive terminal of the receiver supply via a resistor R3. The negative-going edge in the collector potential of transistor TR1 consequently causes transistor TR2 to switch off, the rectifier limiting the reverse base-emitter bias voltage of transistor TR2. After this negative-going edge the capacitor C2 charges via the resistor R3 until the switch-on voltage of rectifier D2 and TR2 is reached, the transistor TR2 thereafter remaining conducting until the next negative-going edge in the collector potential of transistor TR1. The voltage waveform at point C is shown in curve C of FIG. 8, and it will be seen that transistor TR2 together with components C2, R3 and D2 constitute timing means producing a negative-going output pulse, of a duration dependent on the values of C2 and R3, in response to each negative-to-positive zero crossing in the system supply voltage.

Figure 8:
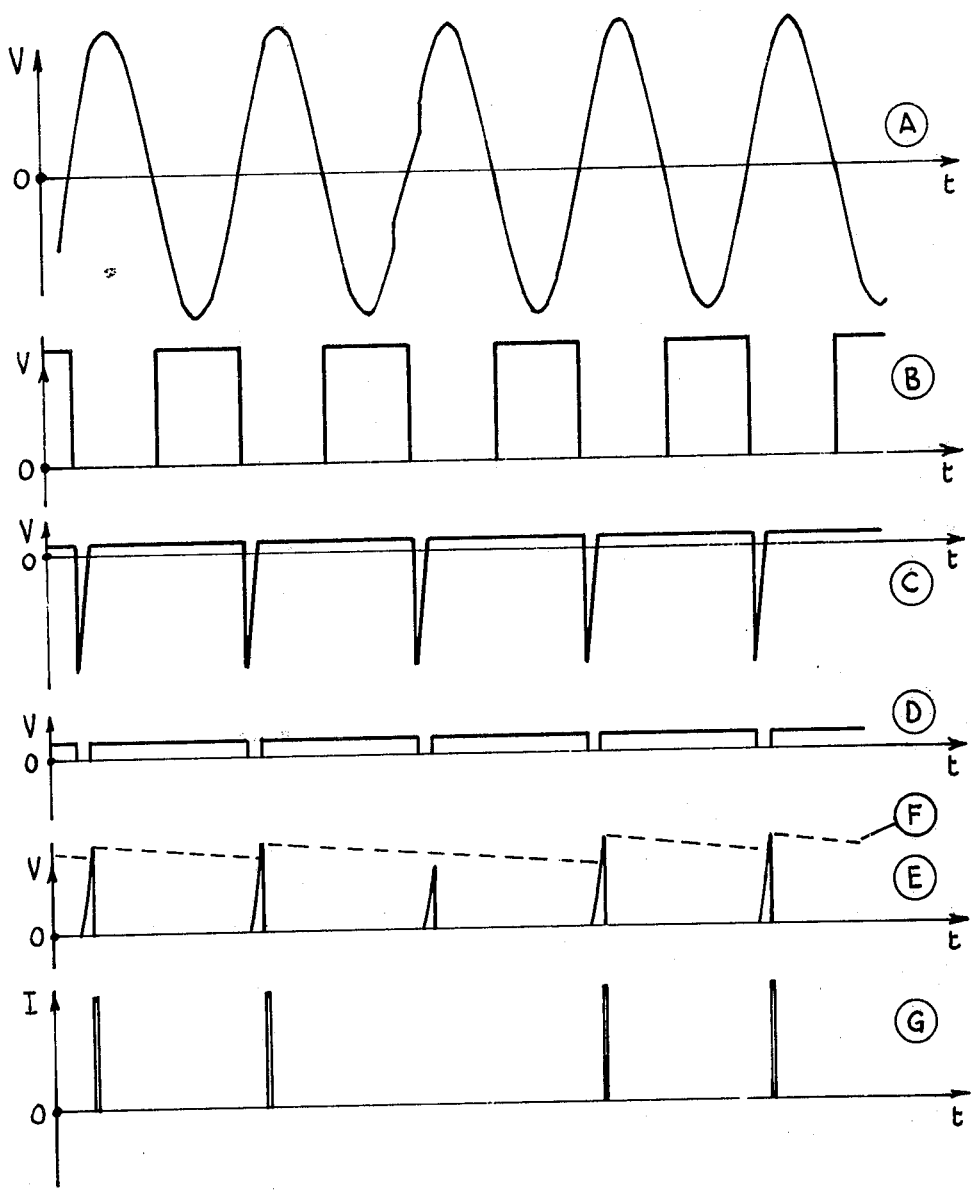
FIG. 8 shows the waveforms of various voltages appearing in the circuit of FIG. 7.

Two resistors R4 and R5 are connected in series in the collector circuit of transistor TR2 and the potential at the junction of the resistors R4 and R5 is applied to the base of a drive transistor TR3 for the transistor TR4, the collector of transistor TR3 being coupled to the base of transistor TR4 via a network comprising three series resistors R6, R7 and R8 and a capacitor C3 connected across resistor R7, curve D of FIG. 8 showing the waveform of the base potential of transistor TR4. The transistor TR3 and hence the transistor TR4 thus switch on and off with the transistor TR2 giving the required non-conduction period of the transistor TR4 following each negative-to-positive zero crossover of the system supply voltage, the duration of this period being dependent on the values of the capacitor C2 and the resistor R3.

We claim:

1. In a system for transmitting information in an A.C. electricity supply system by reducing the instantaneous value of the A.C. supply voltage during the same small fractional part of each of a selection of cycles of the supply voltage waveform, said part including a time of voltage zero, a transmitter comprising: controllable switch means connected across said supply system in an effective zero impedance path so as to effectively short-circuit said supply system throughout the whole of any period that the switch means is closed and thereby draw from said system throughout the whole of any period that said switch means is closed a current of sufficient magnitude to reduce the instantaneous value of the A.C. supply voltage during the time that said switch means is closed and conducting; and switch control means for closing said switch means for a said small fractional part of any selected single cycle of the supply voltage waveform.

2. A transmitter according to claim 1 wherein said switch means comprises an electronic switch of the kind which, once closed, remains closed until the current through the switch means returns to zero so that in each selected cycle the switch means is closed and conducting for a period determined by the system impedance.

3. A transmitter according to claim 2 wherein said switch control means comprises: peak detection means which produces an output indicative of the occurrence of a peak value of the voltage of the supply system; timing means which initiates a timing period in response to the output of said peak detection means; and a pulse generator which generates an operating pulse for the switch in response to the end of the timing period defined by said timing means.

4. A transmitter according to claim 3 including an AND gate having a first input to which the output of the pulse generator is applied; and a code generator for supplying pulses to a second input of the AND gate in accordance with the desired selection of cycles, the output of the AND gate being utilized to control the operation of said electronic switch.

5. A transmitter according to claim 4 including means for applying a signal to a further input of the gate so as to allow the gate to open only when the supply voltage waveform has a predetermined slope, and means for applying a signal to a further input of the gate so as to allow the gate to open only when the instantaneous value of the supply voltage is less than a predetermined value.

6. A transmitter according to claim 2 in combination with an alternating current electricity supply system distribution transformer having primary and secondary windings, said switch being connected across a secondary winding of said distribution transformer.

7. In a system for transmitting information in an A.C. electricity supply system by reducing the instantaneous value of the A.C. supply voltage during the same small fractional part of each of a selection of cycles of the supply voltage waveform, said part including a time of voltage zero, a receiver comprising: an integrator which integrates the instantaneous value of the supply voltage system for short periods each less than the supply voltage cycle period and each starting at a zero crossing of the waveform of said voltage, the integrator being reset between successive integration periods; and means for detecting when the output of said integrator for an integration period differs from the output of the integrator for the preceding integration period.

8. A receiver according to claim 7 wherein said detecting means comprises a capacitance arranged to charge to the peak value of the output of said integrator; means for partly discharging said capacitance between integration periods; and means for monitoring the supply of charging current to said capacitance.

9. A receiver according to claim 8 wherein said integrator comprises: a capacitance connected in series with a resistance across said voltage; an electronic switch connected across said integrator capacitance; and means for opening said switch during each said integration period.

10. A receiver according to claim 9 wherein said means for opening said switch comprises: reference means arranged to produce an output indicative of the occurrence of zero-crossings in said voltage at the receiver; timing means responsive to the output of the reference means to produce an output signal for a predetermined period following said each zero-crossing; and driver means for utilizing the timing means output to open said switch.

* * * * *

US004254403B1

REEXAMINATION CERTIFICATE (2305th)
United States Patent [19]
Perez-Cavero et al.

[11] B1 4,254,403
[45] Certificate Issued May 31, 1994

[54] SYSTEMS FOR TRANSMITTING INFORMATION IN AN ALTERNATING CURRENT ELECTRICITY SUPPLY SYSTEM

[75] Inventors: Leonardo Perez-Cavero, Media, Pa.; Michael W. A. Cross, Bristol, England; Geoffrey Fielding; Frederick M. Gray, both of Stafford, England

[73] Assignee: General Electric Comp., Ltd., London, England

Reexamination Request:
No. 90/003,211, Oct. 4, 1993

Reexamination Certificate for:
Patent No.: 4,254,403
Issued: Mar. 3, 1981
Appl. No.: 63,965
Filed: Aug. 6, 1979

Related U.S. Application Data

[63] Continuation of Ser. No. 786,578, Apr. 11, 1977, abandoned, which is a continuation-in-part of Ser. No. 596,443, Jul. 18, 1975, abandoned.

[30] Foreign Application Priority Data

Jul. 18, 1974 [GB] United Kingdom ............... 31964/74

[51] Int. Cl.$^5$ ............................................. H04B 3/54
[52] U.S. Cl. ............................... 340/310 R; 328/127; 328/151

[56] References Cited

U.S. PATENT DOCUMENTS

| | | | |
|---|---|---|---|
| 2,357,995 | 9/1944 | Blomberg et al. | 340/310 A |
| 2,906,897 | 9/1959 | Laudel, Jr. | 307/140 |
| 3,307,112 | 2/1967 | Clark | 307/260 X |
| 3,488,517 | 1/1970 | Cowan et al. | 340/310 A X |
| 3,594,584 | 7/1971 | Woods | 340/310 A X |
| 3,714,451 | 10/1973 | Whitney et al. | 340/310 R X |
| 3,818,466 | 6/1974 | Honda | 340/310 R X |
| 3,895,369 | 7/1975 | Ono et al. | 340/310 R |

FOREIGN PATENT DOCUMENTS

| | | |
|---|---|---|
| 691426 | 5/1940 | Fed. Rep. of Germany . |
| 763437 | 10/1952 | Fed. Rep. of Germany . |
| 1465459 | 4/1969 | Fed. Rep. of Germany . |
| 1563485 | 5/1970 | Fed. Rep. of Germany . |
| 2227075 | 12/1973 | Fed. Rep. of Germany . |
| 1446868 | 6/1966 | France . |
| 1533502 | 7/1968 | France . |
| 149240 | 6/1967 | New Zealand . |
| 7510430-7 | 9/1976 | Sweden . |
| 205076 | 8/1939 | Switzerland . |
| 448512 | 6/1936 | United Kingdom . |
| 472431 | 9/1937 | United Kingdom . |
| 477223 | 12/1937 | United Kingdom . |
| 482152 | 3/1938 | United Kingdom . |
| 1117309 | 6/1968 | United Kingdom . |
| 1153908 | 6/1969 | United Kingdom . |
| 1196906 | 7/1970 | United Kingdom . |
| 1244608 | 9/1971 | United Kingdom . |
| 1285476 | 8/1972 | United Kingdom . |
| 1341025 | 12/1973 | United Kingdom . |
| 1358074 | 6/1974 | United Kingdom . |

OTHER PUBLICATIONS

Textbook: "Integrated Electronics", by Millaman and Halkias, published by McGraw-Hill, pp. 722 and 723, Date Unknown.

*Primary Examiner*—Jeffery A. Hofsass

[57] ABSTRACT

A system for transmitting information in an alternating current supply system wherein information is transmitted by reducing the instantaneous value of the supply voltage during a corresponding period in each of a selection of cycles of the supply voltage, the selection of cycles determining the information transmitted. To minimize disturbance of the system voltage the period of alteration includes a voltage zero. The alteration is effected by closing a switch connected across the system for the period the voltage reduction is required.

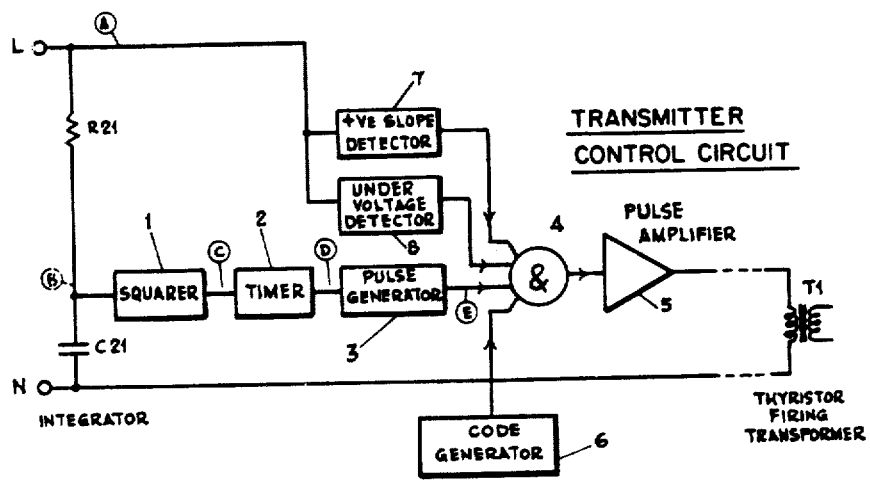

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *